(12) United States Patent  
Rose et al.

(10) Patent No.: US 8,717,179 B2
(45) Date of Patent: May 6, 2014

(54) WEIGHT SENSING ALARM FOR CHILD OR BABY STROLLERS

(76) Inventors: Paul Rose, Mt. Sterling, KY (US); James Thompson, Mt. Sterling, KY (US)

(*) Notice: Subject to any disclaimer, the term of this patent is extended or adjusted under 35 U.S.C. 154(b) by 306 days.

(21) Appl. No.: 13/267,286

(22) Filed: Oct. 6, 2011

(65) Prior Publication Data

US 2013/0088344 A1    Apr. 11, 2013

(51) Int. Cl.
*G08B 21/00* (2006.01)

(52) U.S. Cl.
USPC .......... 340/573.1; 340/667; 340/438

(58) Field of Classification Search
USPC .......... 340/666, 667, 573.1, 438, 540, 568.1
See application file for complete search history.

(56) References Cited

U.S. PATENT DOCUMENTS

| | | |
|---|---|---|
| 1,969,554 A | 8/1934 | Gloudemans |
| 4,295,133 A * | 10/1981 | Vance .......... 340/573.4 |
| 4,888,580 A | 12/1989 | Distel |
| 5,345,221 A | 9/1994 | Pons |
| 5,933,083 A | 8/1999 | Sobczynski |
| 6,448,895 B1 | 9/2002 | Ekkel |
| 6,819,249 B1 | 11/2004 | Papp |
| 6,992,588 B1 | 1/2006 | Santosstefano |
| 7,106,207 B1 | 9/2006 | Marchan |
| 7,319,382 B1 | 1/2008 | Vu |
| 7,551,068 B2 | 6/2009 | Powell |
| 7,786,852 B2 | 8/2010 | Kautz |
| 7,786,882 B2 | 8/2010 | Okawa |
| 7,836,529 B2 | 11/2010 | Cherubini |
| 7,924,163 B1 | 4/2011 | Long |
| 8,154,416 B1 * | 4/2012 | Olson .......... 340/667 |
| 2004/0201487 A1 | 10/2004 | Benson |
| 2005/0068162 A1 | 3/2005 | Santa Cruz |
| 2007/0096891 A1 | 5/2007 | Sheriff |
| 2008/0316043 A1 | 12/2008 | Gomes |
| 2010/0253504 A1 | 10/2010 | Lliteras |

* cited by examiner

*Primary Examiner* — Jeffery Hofsass
(74) *Attorney, Agent, or Firm* — Stockwell & Smedley, PSC

(57) ABSTRACT

The present invention relates to a device, system, kit or apparatus for use with a child or stroller for detecting the removal of the child or baby form the stroller. The present invention may have a fixed plate secured to the frame of the stroller and a flexible plate in close association with a seat of the stroller. The fixed plate and the flexible plate are attachment to the stroller such that they are substantially parallel to each other. A sensor mounted on the fixed plate is engaged directly or indirectly by bending of the flexible plate due to the weight of the child or baby in the seat of the stroller. When the weight of the baby or child is removed from the seat, the flexible plate disengages the sensor due to the flexible plate being biased to maintain its original shape and an alarm is activated.

20 Claims, 3 Drawing Sheets

WEIGHT SENSING ALARM FOR CHILD OR BABY STROLLERS

BACKGROUND

1. Field of the Invention

The present invention relates to a device to alert a parent or guardian when a child or baby is removed from a stroller.

2. Related Art

Parents are usually diligent in maintaining vigilance of their children while in public. Yet distractions caused by various activities and watching other children can inevitably cause a parent or guardian to at least temporarily lose sight of a child or baby in their custody. Each year, nearly 800,000 children are reported missing in the United States. While most of those children reported missing were found safe and alive after a short period of time, some may sadly be harmed, held by a kidnapper indefinitely or never found (Statistics from National Center for Missing and Exploited Children website; www.missingkids.com). A child may become lost or missing not only by kidnapping, but also by the child wandering off on their own volition, thus causing a concerned parent or guardian to become worried and frantic in trying to find the lost or missing child.

Thus, there is a need for devices that will instantly alert a parent or guardian when a child in their custody is being abducted or simply becomes missing by wandering or migrating away from the parent or guardian. Such devices would also have the benefit of giving the parent or guardian peace of mind that they will be alerted if someone attempted to remove the child or if the child did decide to wander off while the child remains within their proximity. While some devices do exist for this purpose, none have a simple design that can be cheaply made to be marketable and installed on existing child or baby strollers.

SUMMARY

According to a first broad aspect, an apparatus is provided comprising: a child or baby stroller, which may be a foldable stroller, having a frame and a seat comprising a fabric, wherein the seat has an upper surface and a lower surface; a fixed plate secured to the frame of the stroller; a flexible plate comprising a resiliently flexible plastic in close association with the lower surface of the seat of the stroller; a sensor mounted on the fixed plate, wherein the flexible plate is biased to maintain its original shape, wherein the fixed plate and the flexible plate are configured such that the fixed plate and the flexible plate are substantially parallel to each other in their planar dimensions, and wherein the flexible plate engages the sensor mounted on the fixed plate by bending the flexible plate when a weight is placed on the seat of the stroller.

According to a second broad aspect, a kit is provided comprising: a fixed plate made of metal configured to have size and shape dimensions for securing to a frame of a stroller; a flexible plate comprising a resiliently flexible plastic configured to have size and shape dimensions for close association with a lower surface of a fabric seat of the stroller, wherein the flexible plate is biased to maintain its original shape; a pressure or weight sensor mounted on the fixed plate; a unit comprising a circuitry and an alarm, wherein the circuitry comprises wiring to connect the sensor and the alarm, and wherein the fixed plate is configured to have a substantially parallel arrangement in relation to the flexible plate in their planar dimensions when the fixed plate is secured to the frame of the stroller.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION

Figure 1:
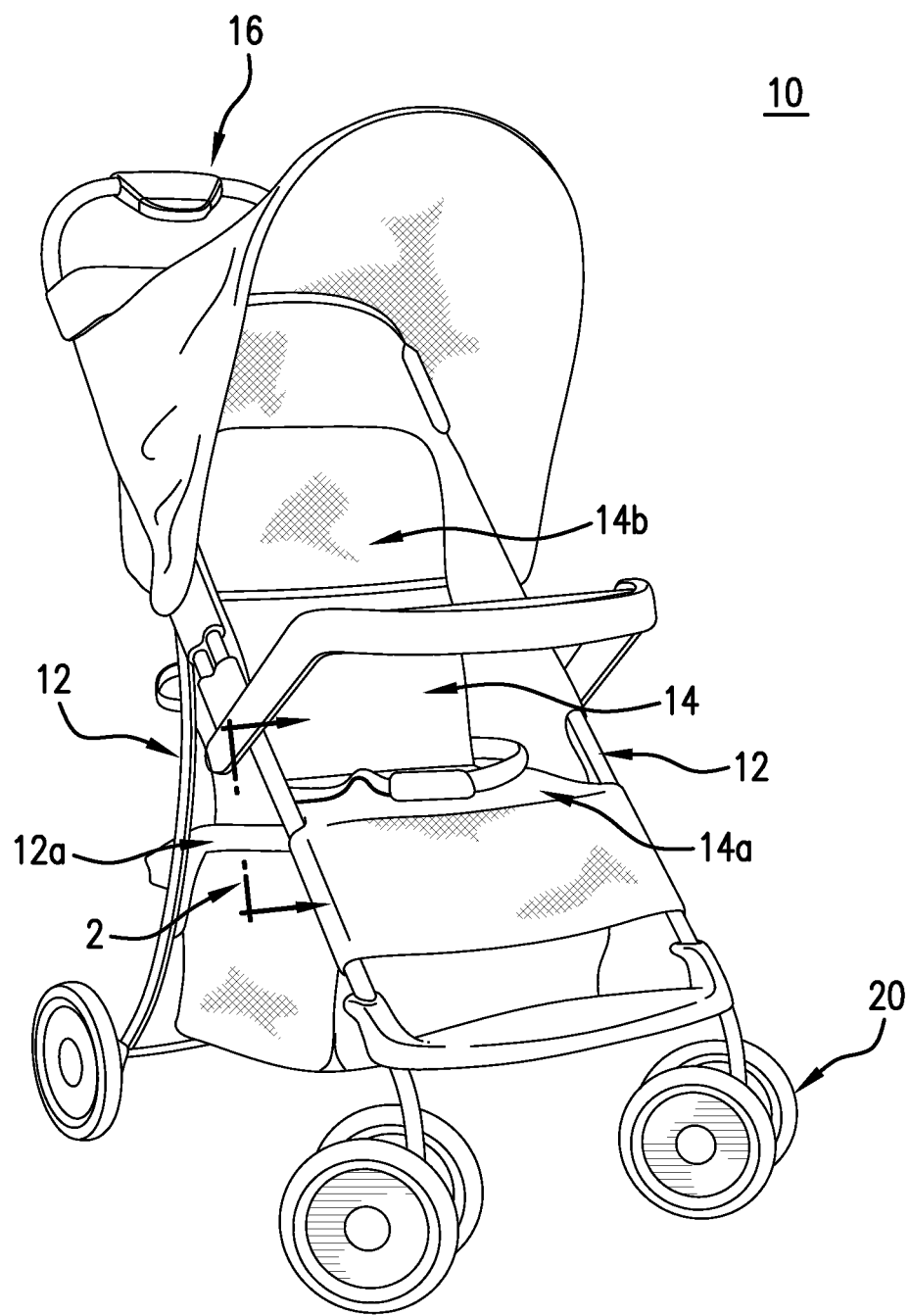
FIG. 1 is a perspective view of a typical child or baby stroller on the market that may be used with an embodiment of the device, apparatus or system of the present invention.

The present invention provides a device, system or apparatus for detecting the removal of a child, baby or infant from a child or baby stroller. There are many different types of strollers on the market from different manufactures. Some strollers are bulky to provide spacious comfort to the child or to carry two children, and some provide storage areas to hold personal items and belongings. Strollers are often designed to fold or retract for easier carrying or storage, such as in a car by minimizing space consumed by the stroller. Other strollers are made to glide easily and/or have light weight for use as a jogging stroller. While each of these strollers on the market today can vary in their form and construction, existing strollers generally have some type of metal frame that supports the stroller and a pliable fabric or other material connected to the frame for the child to actually sit or lay on. Many other materials, such as padding, straps, buttons, etc., may also form part of the stroller.

According to embodiments of the present invention, a device, system or apparatus is provided for connection to the structure of an existing stroller that is responsive to the removal of the weight of a child or baby placed in the stroller. The device or apparatus is equipped or configured such that a sensor will detect the removal of the weight of the child or baby from the stroller and actuate an alarm. The device or apparatus may generally comprise a fixed plate and a flexible plate arranged generally in parallel to one another when each are connected, attached or secured to their respective portions of the stroller. The fixed plate is generally arranged or configured in attachment or association with the frame of the stroller. The fixed plate may be generally made of a hard and inflexible material, such as metal or hard plastic, such that it may be used to mount or hold a sensor attached or secured to the fixed plate. The flexible plate is generally arranged or configured in attachment, contact or association with a fabric portion of the seat of the stroller such that the flexible plate bends due to the weight of the baby or child being placed upon it.

According to embodiments of the present invention, the flexible plate is made of a resilient material and has size dimensions that give it a property or characteristic of having "memory" that causes the flexible plate to be biased to return to its original shape when the force or weight causing it to bend is removed (i.e., biased to maintain an original shape that is counteracted by application of the force or weight). According to some embodiments, the flexible plate may have a size and shape that covers a substantial portion of a lower surface of the seat of the stroller. When the flexible plate associated with a fabric portion of the seat of a stroller is bent under the weight of a child or baby being placed in the stroller, the bending causes the flexible plate to engage or meet a sensor mounted on or to the fixed plate. Thus, when the weight of the baby or child is removed from the stroller, the flexible plate due to its property or characteristic of memory or biasing returns to its original shape and disengages the sensor (i.e. moves away from the sensor such that it is no longer in contact with the sensor). This may then cause the sensor to trigger an alarm via one or more circuit(s).

FIG. 1 provides an example of a typical baby stroller 10. However, the exact construction of baby or child strollers can vary widely, and embodiments of the present invention are envisioned for potential use with any stroller. The stroller 10 may have a frame 12, typically made of metal, arranged or configured to connect to the wheels 20 and form or connect to a handle 16 for pushing. The handle 16 may be continuous with the rest of the frame 12 (e.g., a portion of the frame 12 may form at least part of handle 16—not shown), or the frame 12 may be connected to a separate piece that forms the handle 16. The frame 12 of the stroller 10 may also support a seat 14 comprising a fabric, textile or other pliable and flexible material to form a pocket and/or surface(s) for holding a baby or child. The fabric may include any material commonly used to form the flexible portion of the seat of a stroller that a baby or child actually sit in. Regardless of its construction, strollers generally comprise at least a frame in association with a seat as essential components.

The fabric or textile forming the seat 14 may have a bottom portion 14a and a back portion 14b to support the child or baby. The bottom portion 14a and back portion 14b may meet to form a bend in the seat 14, such that the bottom portion 14a and back portion 14b form an L-shape arrangement, such as for a child that is sitting up. The seat 14 may be adjusted between being reclined or upright by pivoting the back portion 14b at the bend of the seat 14. Alternatively, the seat 14 may be more continuous, such as to form a sling, for holding the child or baby without an identifiable bend in the seat (not shown). The fabric of the seat 14 may generally comprise a suitably pliable and bendable fabric that will conform to some extent to the shape of the baby or child and may be further combined with padding or additional materials for comfort. As well known, additional accessories, such as straps, foot rest, canopy, tray, etc., may also be included as part of the stroller. The fabric of the seat 14 may alternatively comprise two or more parallel sheets of fabric or material that may be juxtaposed with each other and/or attached, sewn, glued, bonded, etc., together, which may include or contain padding and other materials within or between the parallel sheets.

The seat 14 (including each of the bottom portion 14a and back portion 14b where applicable) will thus have an upper surface generally facing or contacting the child or baby placed in the stroller (i.e., facing upward and/or forward) and a lower surface generally facing away from the child or baby (i.e., facing downward and/or backward). Thus, the flexible plate may be in close association and/or in contact with a lower surface of the seat of the stroller. For example, the flexible plate may be in close association and/or in contact with the lower surface of the bottom portion 14a of seat 14 (i.e., below the bottom portion 14a of seat 14). The flexible plate may also or alternatively be in close association and/or in contact with the lower surface of the back portion 14b of seat 14 (i.e., behind the back portion 14b).

Figure 2A:
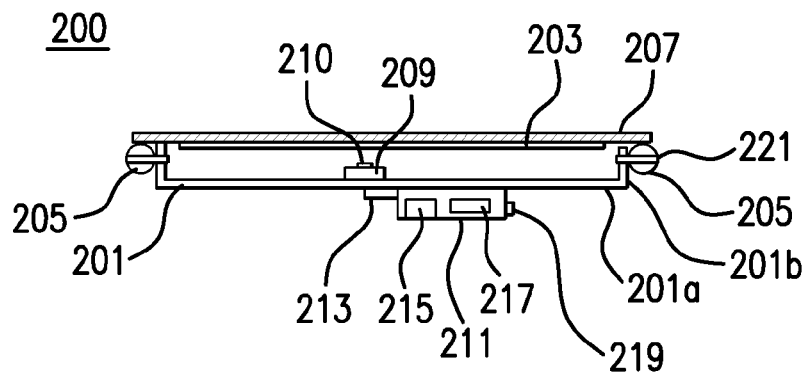
FIG. 2A is a cross-sectional view through a portion of the seat of the stroller in FIG. 1 as indicated by the dotted line in FIG. 1 in combination with the device, apparatus or system of the present invention when the seat of the stroller is unoccupied.

FIG. 2 shows cross-sectional views of the seat and frame of a stroller in association with the device, system or apparatus 200 of the present invention according to some embodiments as viewed from the rear of the stroller according to some embodiments. The cross-sectional view in FIG. 2A may correspond to the vertical plane defined by the dotted line and arrows 2 in FIG. 1 as viewed from the rear of the stroller. FIG. 2A shows a condition or state in which the baby or child is not present in the seat 207 of a stroller. Thus, seat 207 and flexible plate 203 are generally planar and not flexed or bent in FIG. 2A, such that they are disengaged from sensor 209, due to the absence of the weight or pressure of the baby or child in the stroller. In this embodiment, the seat 207 and flexible plate 203 are shown in close contact with each other, although it may be envisioned that a small spacing or gap may exist between lower surface of seat 207 and flexible plate 203.

As shown in the embodiment in FIG. 2, a fixed plate 201 is provided that is attached, connected, secured, etc., to the frame 205 of the stroller. According to embodiments of the present invention, the fixed plate 201 may be attached, connected, secured, etc., to the frame 205 by being soldered, welded or bonded together or by use of one or more fasteners 221, such as a bolt, rivet, screw, etc. According to some embodiments, the fixed plate 201 may have a main facing portion 201a facing the seat 207 of the stroller and a flange portion 201b for connecting to inner (or outer) side of frame 205. According to the embodiment shown in FIG. 2, the fixed plate 201 may be attached, connected, secured, etc., to a horizontal piece(s) 12a of the frame 205 via the fasteners 221. However, the embodiment shown in FIG. 2 is only an example. Indeed, the fixed plate of the present invention may be attached, connected, secured, etc., to the frame of any given stroller in any suitable way depending on the particular structure and arrangement of the frame of the stroller as long as the fixed plate is arranged or configured such that it is generally or substantially parallel to at least one surface or portion of the seat of the stroller when the stroller is ready for use.

For purposes of the present invention, the phrase "substantially parallel" refers to an arrangement in which two or more of the flexible plate, the fixed plate and/or a portion or surface of the seat of the stroller are mostly parallel in their planar dimensions. The phrase "substantially parallel" is meant to include small angle variations (e.g., less than 5-10 degrees) from them being perfectly parallel in their planar dimensions.

For purposes of the present invention, the phrase "ready for use" refers to a stroller that is assembled and appropriately positioned with its wheels on the ground for safely receiving a child or baby as intended for proper use. For folding strollers, the phrase "ready for use" refers to a stroller that is extended and unfolded for use. Any ordinary user of a stroller would know when a stroller is in a state or condition that is "ready for use."

The fixed plate may be arranged or configured such that it is generally or substantially parallel to a bottom portion of the seat (i.e., the direction in which much of the downward force caused by the weight of the child or baby in the seat of the stroller is directed). It is also conceivable that weight may also be continuously directed toward the lowermost portion of a back portion of the seat when a child or baby is in the seat of the stroller. Thus, the fixed plate may also be arranged or configured such that it is generally or substantially parallel to a lower part of a back portion of the seat. However, changes in the weight or pressure directed toward the upper part of the back portion of the seat of the stroller may vary even when a child or baby is present in the seat due to shifting or leaning of the child or baby in the seat, which may inadvertently activate the alarm of the present invention when the baby or child is actually still present in the seat. Thus, the fixed plate of the present invention for holding a sensor may be near to, and parallel with, the lower part (but generally not the upper part) of a back portion of the seat of a stroller.

The fixed plate of the present invention is generally used to immovably hold a sensor mounted, secured, etc., thereto, such that a flexible plate of the present invention may engage the sensor when a weight is applied to the seat of the stroller. As shown in the embodiment in FIG. 2A, a sensor 209 may be mounted on or to fixed plate 201 such that it is facing seat 207 of stroller. For example, sensor 209 may be mounted on or to a main facing portion 201a of fixed plate 201. In this example, the fixed plate 201 is shown attached to horizontal bars or piece(s) of the frame 205 of the stroller. However, a fixed plate according to other embodiments of the present invention may be attached in many different ways and orientations and/or to other portions of a frame of a stroller depending on the particular structure of the stroller as long as the fixed plate is held in an immovable position generally or substantially in parallel with a surface of a portion of the seat of the stroller associated with the flexible plate when the stroller is ready for use (e.g., unfolded for use in the case of foldable strollers).

Because it is important that the fixed plate remain generally immovable for holding the sensor in place while the stroller is being used and when the baby is placed into, and removed from, the seat, the fixed plate will be generally be made of a metal, such as steel, aluminum, etc. The width dimensions of the metal used for the fixed plate may vary depending on the strength of the metal, the overall size of the fixed plate and its manner of attachment (i.e., how many attachments or fasteners) to the frame. For example, the thickness may be about ⅛ of an inch. The size of the fixed plate in the planar dimension may vary depending on the stroller, but may be a size suitable for being attached, etc., to the frame of the stroller at generally two or more locations, such as a size sufficient to span two opposing portions of the frame on the left and right sides of the stroller, respectively. In addition to metal, it is also envisioned that a hard plastic or other hard material may also be used for the fixed plate as long as it maintains its strength and does not crack or break too easily through normal use. A reinforcement rod or other means may also be used in conjunction with a hard plastic to strengthen or reinforce the fixed plate. Other means for immovably holding a sensor in place and fixed in relation to the overall position of the stroller are also envisioned. For example, it is conceivable that rods attached or secured to the frame might be used as a "fixed plate" according to some embodiments as long as it is sufficiently strong and stable to hold a sensor in place.

Continuing with the example in FIG. 2A, a flexible plate 203 is further provided in close association or in contact with a lower surface of the seat 207 of the stroller. For example, the flexible plate may be in contact with and/or attached, bonded, glued, sewn, etc., to at least some of the bottom portion and/or back portion of the seat. Alternatively, the flexible plate may be closely associated with a lower surface of the seat but have a small gap or spacing between the seat and the flexible plate (not shown). However, it would be important that such a gap or spacing be small enough such that the seat would still engage and apply pressure to the flexible plate to bend the flexible plate when a sufficient weight is placed on the seat. Even when at least a portion of the flexible plate is associated or in contact with and/or attached, etc., to the bottom portion of the seat, an additional portion of flexible plate may be perpendicular thereto (to produce an L-shaped flexible plate), which may be in contact with and/or attached, etc., to the back portion of the seat. Such an L-shaped flexible plate may also be used to strengthen the biasing of the flexible plate toward its original and/or generally planar shape and/or to more firmly secure the flexible plate to the seat. The flexible plate may also be attached to the frame of the stroller to create a close association with a surface of the seat of the stroller, which may be an alternative to being directly attached, etc., to a portion of the seat.

In any case, the flexible plate will generally be placed at a position within the stroller that corresponds to the position of the fixed plate of the present invention but that is spaced apart from the fixed plate when the stroller is ready for use (e.g., in an extended or unfolded state for folding strollers). Further, the flexible plate will be positioned, configured, placed, disposed etc., such that the fixed plate and the flexible plate are generally or substantially parallel to one another in their planar dimensions when the stroller is ready for use. Moreover, the fixed plate (and the flexible plate) according to many embodiments of the present invention may be positioned, configured, placed, etc., such that the fixed plate and the flexible plate are generally or substantially horizontal and/or generally or substantially parallel to the ground when the stroller is ready for use.

The flexible plate of the present invention will be generally made of a planar sheet of plastic or polymeric material that will bend or flex when pressure or weight is applied to at least a portion of the flexible plate. The bending or flexing of the flexible plate may be caused at least in part due to portions of the flexible plate, such as the edge(s) or outer portion(s) of the flexible plate, receiving relatively less force or weight and/or being relatively held or impeded in movement (e.g., due to the flexible plate being attached or more closely tethered to the frame or other portion of the stroller). Because the flexible plate according to embodiments of the present invention must bend or flex in response to weight being applied to the seat of a stroller to engage a sensor but then be able to revert to its original shape and disengage from the sensor when the weight is removed from the seat, the flexible plate will be generally made of a flexible or pliable material with "memory" that will bend under sufficient pressure or weight, but revert or return to its original shape when the weight or pressure is sufficiently removed.

In other words, the flexible plate should be made of a plastic or polymeric material having sufficient stiffness to revert to its original shape when the pressure or weight is removed even after repeated rounds of bending and unbending of the material over a long period of time. However, the flexible plate should not be too hard or brittle, such that it would crack or break under pressure. Conversely, the flexible plate should not be made of a material that is too soft such that it would remain bent or flexed even after a pressure or weight is removed from it. It is also preferable that the material be made of a material that is sufficiently resistant against degradation or deterioration due to exposure to the atmosphere since strollers may be used outdoors. According to embodiments of the present invention, the flexible plate may comprise any plastic or polymeric materials having these desired properties and combinations thereof that are known in the art. For example, the flexible plate may comprise an acrylonitrile butadiene styrene (ABS) or other plastics having similar properties, such as MAGNUM® products (Dow Chemical) and the like.

The sensor according to embodiments of the present invention may be attached, connected or mounted on or to the fixed plate and include any suitable sensor that detects contact of another surface or pressure or weight applied to the sensor from another object or surface. For example, the sensor may include a compressible portion, such as a compressible portion or button 210 of sensor 209 as shown in FIG. 2A. The sensor 209 in FIG. 2 may be electrically connected by a wire 213 to unit 211. Unit 211 in FIG. 2 may include a speaker 215, or more broadly any siren, alarm or other form of alert, which will indicate an alarm condition when a child or baby is removed from the stroller to disengage sensor 209.

Unit 211 in FIG. 2 may further include circuitry 217 in connection or communication with wire 213 to sensor 209. Circuitry 217 of unit 211 may function to determine whether and when an alarm, such as speaker 215, is activated in response to a change in the status of weight or pressure being applied to the seat of stroller as detected by sensor 209. In a simpler example, circuitry 217 of the present invention may comprise a closed circuit loop with a power source, such as a battery, that activates an alarm when the weight or pressure is removed from the seat of the stroller. According to some embodiments, unit 211 and/or circuitry 217 may also include a master switch 219 for turning the device or system of the present invention on/off (i.e., the alarm may only be activated when the master switch is in the on position). Master switch 219 may also function to establish an initial state or condition, such as a baby or child being present in the seat, so that circuitry 217 "knows" to activate an alarm when sensor 209 detects removal of the weight of the child or baby from seat of stroller. Circuitry 217 may also optionally include a portion that will cause alarm or speaker 215 to remain activated even if a weight or pressure is replaced onto seat of stroller after the child or baby is removed (i.e., despite the sensor being re-engaged). According to these embodiments, the circuit may then require actuating a master switch or other overriding mechanism to reset or deactivate the alarm or circuit and/or turn the alarm off.

Although unit 211 with circuitry 217 and master switch 219 is shown attached to fixed plate 201 along with sensor 209 (albeit on opposing surfaces), embodiments of the present invention further provide that unit 211 may be located elsewhere on stroller apart from fixed plate 201. According to some embodiments, master switch 219 may be located elsewhere on stroller apart from fixed plate 201 either in association with or integrally a part of unit 211 or separately from unit 211. Indeed, master switch 219 may be located elsewhere on stroller apart from fixed plate 201 even with unit 211 associated with or attached to fixed plate 201. For example, unit 211 and/or master switch 219 may be located on or connected to the handle of the stroller. The unit 211 and/or master switch 219 may be located on or connected to the handle of the stroller either alone, separately or together for ease of access by a parent or guardian. According to some embodiments, the master switch or other components may be connected to the rest of the device, apparatus or system wirelessly or through one or more wires.

Figure 2B:
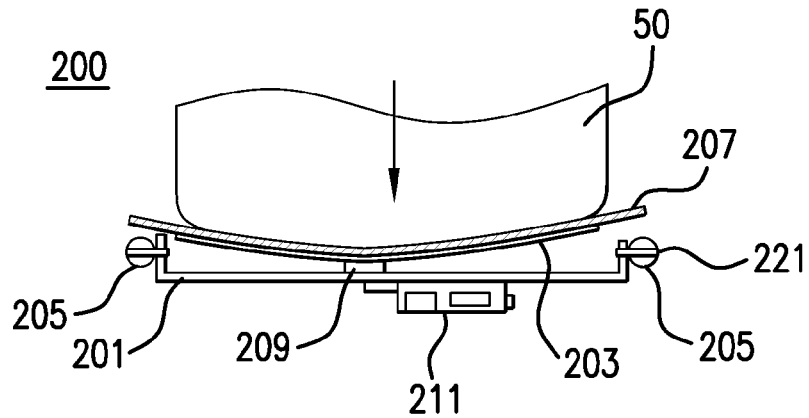
FIG. 2B is a cross-sectional view through the same portion of the seat of the stroller in FIG. 1 in combination with the device, apparatus or system of the present invention showing a state when a child or baby is present in the seat of the stroller.

According to embodiments of the present invention, the device or apparatus 200 of FIG. 2A is shown in a different state or condition in FIG. 2B. FIG. 2A shows the state or condition in which no weight, force or pressure is applied to the seat 207 of stroller, whereas FIG. 2B shows the state or condition in which weight, force or pressure is applied to the seat 207 of stroller by placing a child or baby 50 in seat 207 of stroller (see arrow). FIG. 2B is mostly similar to FIG. 2A except that the weight of child or baby 50 placed in seat 207 causes the seat 207 and flexible plate 203 to bend. Thus, seat 207 and flexible plate 203 become bent such that flexible plate 203 engages or contacts sensor 209 of device or apparatus 200. This signals to unit 211 and/or circuitry 217 of system or apparatus 200 that the child or baby is present in seat 207 of stroller.

Therefore, it is important that the spacing between fixed plate and the flexible plate of the present invention be sufficiently large such that the sensor is not engaged too easily or inadvertently, but short enough that the flexible plate will contact, meet or engage the sensor when the weight of a child is placed in seat of stroller. For example, such spacing (without weight or pressure applied to seat—i.e., when the seat is unoccupied) may be greater than zero (0) but less than about 2-3 inches, or alternatively greater than 0 inches but less than about 3-4 inches. For example, such spacing may be about 1 inch or about 1-3 centimeters according to some embodiments. However, it is to be understood that the flexible plate may also engage the sensor indirectly via one or more additional components that may convey or transfer the weight, pressure or force from the bent flexible plate to the sensor when the baby or child is placed in the seat of stroller, wherein the one or more additional components themselves contact or engage the sensor directly.

According to these embodiments, due to the nature of the material forming the flexible plate 203, when the baby or child 50 is removed from, or no longer present in, the seat 207 of stroller, the flexible plate 203 may then spring or revert back to the shape it had prior to the child or baby 50 being placed in the seat 207 (e.g., as in FIG. 2A) due to the pressure or weight being removed or released. For example, as shown in FIG. 2, the flexible plate 203 may revert back to its original and generally planar shape when the weight of the child or baby 50 is removed from seat 207 due to the "memory" property of the flexible plate 203. Thus, the flexible plate 203 no longer contacts and/or disengages sensor 209 associated with fixed plate 201 without the weight of the baby or child 50 to bend the flexible plate 203 to meet the sensor 209. Because the sensor is no longer compressed, pushed, engaged, etc., the flow of electricity through the circuitry 217 of the apparatus or system 200 is altered and an alarm is generated, such as via a speaker 215.

Figure 2C:
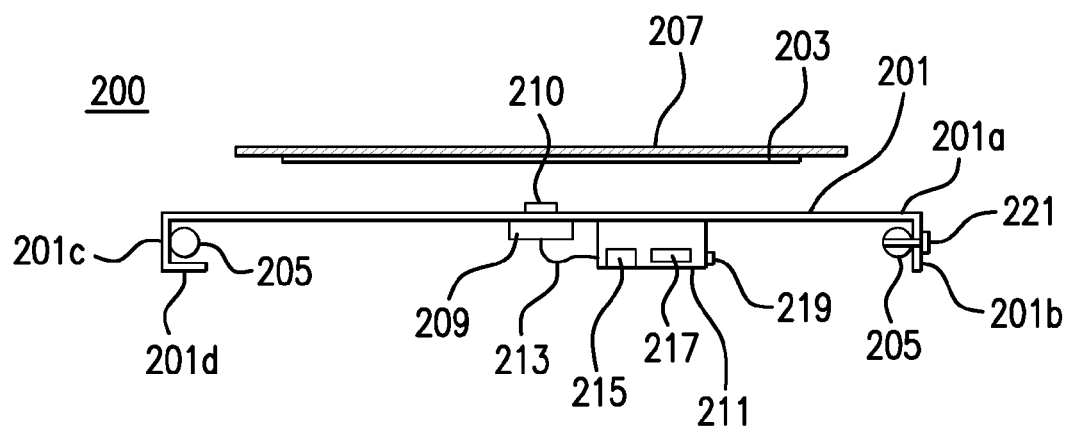
FIG. 2C is a cross-sectional view through a portion of the seat of the stroller in FIG. 1 in combination with an alternative embodiment of a device, apparatus or system of the present invention when the seat of the stroller is unoccupied.

As mentioned above, alternative arrangements of components of the present invention in combination with a stroller are also envisioned. For example the fixed plate may be attached to the frame of the stroller in a variety of ways. FIG. 2C provides another embodiment for device or apparatus 200 of the present invention having at least a different manner of attachment for fixed plate 201 to frame 205 of stroller. In this embodiment, the fixed plate 201 is arranged over the top of frame 205 with main facing portion 201a of fixed plate 201 on top of frame 205 and flange portions 201b, 201c oriented downward on outer sides of frame 205. Again, fixed plate 201 may be attached, connected, secured, etc., to frame 205 via one or more fasteners 221. According to some embodiments as shown in FIG. 2C, fixed plate 201 may further include lip portion 201d to wrap around at least one piece of the frame 205. The combined features of fixed plate 201 in FIG. 2C of resting on the frame 205 around the outer sides of frame 205 and under at least one side of the frame 205 with lip portion 201d may each serve to stabilize the fixed plate to the frame in addition to the one or more fasteners 221. The cross-sectional length of the flange portions 201b, 201c may be approximately the width or diameter of the piece of frame 205 to which it is secured, attached, etc., and the cross-sectional length of lip portion 201d may be roughly equal to that of flange portion 201c. According to these embodiments, as few as one fastener may be used to attach, etc., the fixed plate 201 to the frame 205 (e.g., on the side of the fixed plate not having the lip portion 201d) due to the stabilization by portions 201b, 201c and 201d. As also shown in FIG. 2C, sensor may alternatively be mounted at least partially on underside of fixed plate 201, such that only compressible portion 210 of sensor 209 extends above the surface of fixed plate 201.

While the present invention includes a stroller comprising the system, device or apparatus of the present invention as described herein, it is further envisioned that some embodiments of the present invention may include the components of the present invention assembled together in a kit that are pre-configured to be attached to a stroller as described herein. For example, at least the flexible plate and the fixed plate would have a size and shape suitable for attachment to a stroller in addition to possibly flanges, holes or other means or configured portions as described herein for attaching, etc., the plates to the stroller, such as via the one or more fasteners, or to provide other features as described herein. Such a kit would include at least a fixed plate, a flexible plate, a plurality of fasteners for attachment to a stroller, a weight or pressure sensor, circuitry and an alarm or speaker. Such a kit may further include a unit, which may house the alarm or speaker and/or the circuitry, and a master switch, which may also be a part of the unit.

Figure 3A:
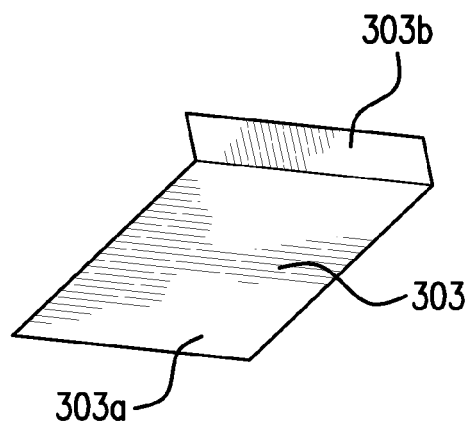
FIG. 3A is a perspective view of a flexible plate according to some embodiments, such as the embodiments shown in FIGS. 2A, 2B and 2C.
Figure 3B:
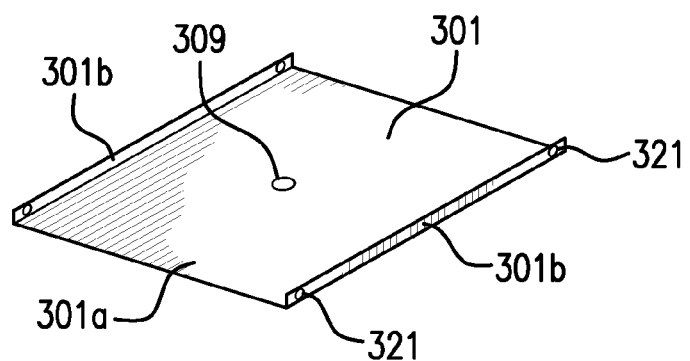
FIG. 3B is a perspective view of a fixed plate according to some embodiments, such as the embodiment shown in FIGS. 2A and 2B.
Figure 3C:
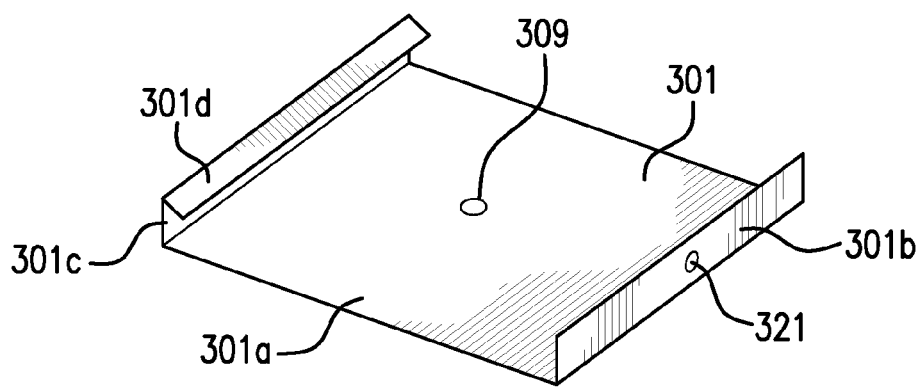
FIG. 3C is a perspective view of the underside of a fixed plate according to an alternative embodiment, such as the embodiment shown in FIG. 2C (the fixed plate is shown upside-down orientation relative to how it would be attached to the stroller to better display its features).

FIG. 3 provides perspective views of a flexible plate 303 in FIG. 3A and a fixed plate 301 in FIGS. 3B and 3C that may be used according to some embodiments of the present invention including the kits described above. In the embodiment in FIG. 3A, a flexible plate 303 may have a portion 303a configured to attach, contact or associate with a bottom portion of a seat of a stroller. The flexible plate 303 may also have an optional perpendicular portion 303b, which may also attach or be connected with a back portion of a seat of a stroller. In FIG. 3B, a fixed plate 301 is shown with a main facing portion 301a and a flange portion 301b for attachment to the frame of the stroller. The fixed plate 301 may include holes 321 for attachment to the frame of the stroller. Further, fixed plate may further include one or more additional holes 309 for attachment of a sensor to the fixed plate. Fixed plate 301 in FIG. 3B may correspond to fixed plate 201 in FIGS. 2A and 2B.

In FIG. 3C, a perspective view of a fixed plate 301 is shown in an alternative arrangement or configuration with a main facing portion 301a and flange portions 301b, 301c in addition to lip portion 301d for attachment to, wrapping around, etc., the frame of a stroller. The fixed plate 301 is shown upside down relative to how it would be attached, etc., to a stroller to display its features. The fixed plate 301 in FIG. 3C may include as few as one hole 321 for attachment to the frame of the stroller. Fixed plate 301 in FIG. 3C may correspond to fixed plate 201 in FIG. 2C. In both FIGS. 3B and 3C, fixed plate 301 may further include one or more additional holes 309 for attachment of a sensor to the fixed plate.

While the present invention has been disclosed with reference to certain embodiments, it will be apparent that modifications and variations are possible without departing from the spirit and scope of the invention as defined in the appended claims. Furthermore, it should be appreciated that all examples in the present disclosure, while illustrating embodiments of the invention, are provided as non-limiting examples and are, therefore, not to be taken as limiting the various aspects so illustrated. The present invention is intended to have the full scope defined by the language of the following claims, and equivalents thereof. Accordingly, the drawings and detailed description are to be regarded as illustrative and not as restrictive.

Particularly, it is intended that regardless of any examples provided herein, the device, system or apparatus of the present invention be adaptable for conceivably any type of child or baby stroller having a frame and a fabric seat. Thus, the components of the present invention as described herein, including the flexible plate and fixed plate, may be modified or tailored in terms of their shape, size and manner of attachment such that components and features of the present invention according to the varying embodiments may be attached, etc., to any given stroller. For example, the fixed plate may be attached differently and/or to a non-analogous portion of the frame of a stroller (i.e., differently than shown in the exemplary embodiment in FIG. 2), and the flexible plate may be tailored differently for the seat of such a stroller as well. However, the flexible plate and the fixed plate will be generally configured, if not assembled as part of the stroller, such that their planar orientations are positioned to be parallel to each other with the spacing as described herein when the stroller is in use, with the fixed plate attached, connected, secured, etc., to the frame of the stroller and the flexible plate associated with the seat of the stroller.

What is claimed is:

1. An apparatus comprising:
a stroller having a frame and a seat, wherein the seat comprises a pliable fabric and has an upper surface and a lower surface;
a fixed plate secured to the frame of the stroller;
a flexible plate comprising a resiliently flexible plastic, wherein the flexible plate is in close association with the lower surface of the seat of the stroller; and
a sensor mounted on the fixed plate;
wherein at least a portion of the flexible plate has a planar shape and is biased to maintain its original planar shape,
wherein the flexible plate engages the sensor mounted on the fixed plate by bending of the flexible plate when a sufficient weight is present on the seat of the stroller,
wherein the flexible plate is separated and disengaged from the sensor when a sufficient weight is not present on the seat of the stroller due to at least the planar portion of the flexible plate being biased to maintain its original planar shape, and
wherein the sufficient weight is a weight on the seat of the stroller that is sufficiently heavy to cause the flexible plate to bend and engage the sensor.

2. The apparatus of claim 1, wherein the fixed plate comprises a metal.

3. The apparatus of claim 2, wherein the fixed plate comprises aluminum.

4. The apparatus of claim 1, wherein the fixed plate is secured to the stroller such that the fixed plate is substantially parallel with a bottom portion of the seat.

5. The apparatus of claim 1, wherein the flexible plate comprises an acrylonitrile butadiene styrene (ABS) plastic.

6. The apparatus of claim 1, wherein the flexible plate is in contact with the lower surface of the seat of the stroller.

7. The apparatus of claim 1, wherein the flexible plate is attached the lower surface of the seat of the stroller.

8. The apparatus of claim 1, wherein the weight causing the flexible plate to engage the sensor by bending of the flexible plate is the weight of a child or baby.

9. The apparatus of claim 1, wherein the fixed plate and the flexible plate are separated by a spacing when a sufficient weight is not present on the seat of the stroller, wherein the spacing is greater than zero inches but less than about 2 inches.

10. The apparatus of claim 1, wherein the sensor comprises a compressible portion that is pushed when the flexible plate engages the sensor.

11. The apparatus of claim 1, further comprising:
an alarm, wherein the alarm is activated when the sensor detects that the weight is removed from the seat by the flexible plate disengaging the sensor.

12. The apparatus of claim 11, further comprising a circuitry connecting the sensor and the alarm.

13. The apparatus of claim 12, wherein the circuitry is configured such that the alarm remains activated after the flexible plate disengages the sensor even if the flexible plate is bent to re-engage the sensor by replacement of a sufficient weight on the seat of the stroller.

14. The apparatus of 12, further comprising a master switch connected to the circuitry having on and off positions, wherein the alarm is activated by disengaging the sensor only when the master switch is in the on position.

15. A kit comprising:
a fixed plate made of metal configured to have size and shape dimensions for attaching to a frame of a stroller;
a flexible plate comprising a resiliently flexible plastic and having at least a portion with a planar shape, wherein the flexible plate is configured to have size and shape dimensions for close association of the flexible plate with a lower surface of a pliable fabric seat of the stroller when the flexible plate is secured to the stroller, wherein at least the planar portion of the flexible plate is biased to maintain its original planar shape;
a pressure or weight sensor configured for mounting to the fixed plate; and
a unit comprising a circuitry and an alarm,
wherein the circuitry comprises wiring to connect the sensor and the alarm, and
wherein the fixed plate and the flexible plate are configured to be separated by a spacing of greater than zero inches but less than 4 inches when the fixed plate and the flexible plate are secured to the stroller and a weight is not present on the seat of the stroller, and wherein the fixed plate is configured to be substantially parallel to at least the planar portion of the flexible plate when the fixed plate and the flexible plate are secured to the stroller.

16. The apparatus of claim 1, wherein the flexible plate is attached to the frame of the stroller.

17. The apparatus of claim 1, wherein the biasing of the flexible plate to maintain its original shape causes the flexible plate to disengage the sensor when the weight is removed from the seat of the stroller.

18. The apparatus of claim 1, wherein at least a main facing portion of the fixed plate is planar in shape, and wherein the main facing portion of the fixed plate is substantially parallel to the flexible plate.

19. The apparatus of claim 1, wherein the stroller is a foldable stroller, and wherein the fixed plate is substantially parallel to the flexible plate when the stroller is unfolded.

20. An apparatus comprising:
a stroller having a frame and a seat, wherein the seat comprises a pliable fabric and has an upper surface and a lower surface;
a fixed plate secured to the frame of the stroller;
a flexible plate comprising a resiliently flexible plastic, wherein the flexible plate is biased to maintain its original shape, the flexible plate being in close association with the lower surface of the seat of the stroller;
a sensor mounted on the fixed plate; and
an alarm, the alarm being activated when the sensor detects that a baby or child is removed from the seat by the flexible plate disengaging the sensor,
wherein the flexible plate engages the sensor by bending of the flexible plate when a sufficient weight is present on the seat of the stroller, the flexible plate bending to engage a compressible portion of the sensor when a sufficient weight is present on the seat of the stroller
wherein the flexible plate is separated and disengaged from the sensor when a sufficient weight is not present on the seat of the stroller,
wherein the sufficient weight is a weight on the seat of the stroller that is sufficiently heavy to cause the flexible plate to bend and engage the sensor, and
wherein the fixed plate is separated from the flexible plate by a spacing of greater than zero inches but less than about 4 inches when a weight is not present on the seat of the stroller.

* * * * *